US011852254B2

(12) United States Patent
Bouchard et al.

(10) Patent No.: US 11,852,254 B2
(45) Date of Patent: Dec. 26, 2023

(54) CHECK VALVE CARTRIDGE WITH FLOW GUIDE FOR COMPACT BACKFLOW PREVENTION ASSEMBLY

(71) Applicant: Watts Regulator Co., North Andover, MA (US)

(72) Inventors: Peter P. Bouchard, Ayer, MA (US); Kevin Simon, Somerville, MA (US)

(73) Assignee: Watts Regulator Co., North Andover, MA (US)

( * ) Notice: Subject to any disclaimer, the term of this patent is extended or adjusted under 35 U.S.C. 154(b) by 354 days.

(21) Appl. No.: 17/403,945

(22) Filed: Aug. 17, 2021

(65) Prior Publication Data

US 2022/0049487 A1 Feb. 17, 2022

Related U.S. Application Data

(60) Provisional application No. 63/066,411, filed on Aug. 17, 2020.

(51) Int. Cl.
*F16K 15/03* (2006.01)
*F16K 15/06* (2006.01)
(Continued)

(52) U.S. Cl.
CPC ............ *F16K 15/066* (2013.01); *E03B 7/077* (2013.01); *E03C 1/106* (2013.01); *E03F 7/04* (2013.01);
(Continued)

(58) Field of Classification Search
CPC ...... F16K 15/066; F16K 15/033; F16K 27/12; F16K 15/035; E03B 7/077; E03C 1/106; E03F 7/04
See application file for complete search history.

(56) References Cited

U.S. PATENT DOCUMENTS

| 213,394 A | 3/1879 | Cornwal |
| 2,310,586 A | 2/1943 | Lohman |

(Continued)

FOREIGN PATENT DOCUMENTS

| CN | 110081212 A | 8/2019 |
| DE | 1925477 U | 12/1970 |

(Continued)

OTHER PUBLICATIONS

Lead Free Master Series LF870V product specifications pp., ES-F-LF-870V 1826, 2018, 4 pages.

(Continued)

*Primary Examiner* — P. Macade Nichols
(74) *Attorney, Agent, or Firm* — Day Pitney LLP; George N. Chaclas

(57) ABSTRACT

A valve assembly having a body forming a bucket having a sidewall extending between an open end and a closed end along a bucket axis. A first conduit and a second conduit extend from the sidewall, wherein the first and the second conduits extend along a conduit axis that is perpendicular to the bucket axis. A frame inserts into the bucket along the bucket axis and includes a valve seat and a valve member biased against the valve seat. A guide is provided in the bucket between the closed end and the frame and extends along a guide axis between a first opening arranged in a first plane and aligned to receive fluid flow from the first conduit and a second opening arranged in a second plane and aligned to direct fluid flow through the valve seat. The first and second planes are not parallel to one another.

15 Claims, 12 Drawing Sheets

(51) Int. Cl.

| | | |
|---|---|---|
| *E03F 7/04* | (2006.01) | |
| *F16K 27/02* | (2006.01) | |
| *E03C 1/10* | (2006.01) | |
| *F16K 27/12* | (2006.01) | |
| *E03B 7/07* | (2006.01) | |
| *F16K 37/00* | (2006.01) | |
| *F16K 17/30* | (2006.01) | |

(52) U.S. Cl.
CPC .......... *F16K 15/033* (2013.01); *F16K 15/035* (2013.01); *F16K 27/0209* (2013.01); *F16K 27/12* (2013.01); *F16K 17/30* (2013.01); *F16K 37/0091* (2013.01); *F16K 2200/501* (2021.08)

(56) References Cited

U.S. PATENT DOCUMENTS

| | | |
|---|---|---|
| 2,514,374 A | 7/1950 | Cooper |
| 2,827,921 A | 3/1958 | Sherman et al. |
| 3,173,439 A | 3/1965 | Griswold et al. |
| 3,189,037 A | 6/1965 | Modesto |
| 3,429,291 A | 2/1969 | Hoffman |
| 3,570,537 A | 3/1971 | Kelly |
| 3,817,278 A | 6/1974 | Elliott |
| 3,837,357 A | 9/1974 | Slaughter |
| 3,837,358 A | 9/1974 | Zieg et al. |
| 3,859,619 A | 1/1975 | Ishihara et al. |
| 3,896,850 A | 7/1975 | Waltrip |
| 3,905,382 A | 9/1975 | Waterston |
| 3,906,987 A | 9/1975 | Rushforth et al. |
| 3,996,962 A | 12/1976 | Sutherland |
| 4,014,284 A | 3/1977 | Read |
| 4,244,392 A | 1/1981 | Griswold |
| 4,276,897 A | 7/1981 | Griswold |
| 4,284,097 A | 8/1981 | Becker et al. |
| 4,416,211 A | 11/1983 | Hoffman |
| 4,452,272 A | 6/1984 | Griswold |
| 4,453,561 A | 6/1984 | Sands |
| 4,489,746 A | 12/1984 | Daghe et al. |
| 4,523,476 A | 6/1985 | Larner |
| 4,618,824 A | 10/1986 | Magee et al. |
| 4,667,697 A | 5/1987 | Crawford |
| 4,694,859 A | 9/1987 | Smith |
| 4,776,365 A | 10/1988 | Bathrick et al. |
| 4,777,979 A | 10/1988 | Twerdochlib |
| 4,920,802 A | 5/1990 | Mcmullin et al. |
| 4,945,940 A | 8/1990 | Stevens |
| 5,008,841 A | 4/1991 | Mcelroy |
| 5,024,469 A | 6/1991 | Aitken et al. |
| 5,072,753 A | 12/1991 | Ackroyd |
| 5,125,429 A | 6/1992 | Ackroyd et al. |
| 5,236,009 A | 8/1993 | Ackroyd |
| 5,299,718 A | 4/1994 | Shwery |
| 5,404,905 A | 4/1995 | Lauria |
| 5,425,393 A | 6/1995 | Everett |
| 5,452,974 A | 9/1995 | Binns |
| 5,520,367 A | 5/1996 | Stowers |
| 5,551,473 A | 9/1996 | Lin et al. |
| 5,566,704 A | 10/1996 | Ackroyd et al. |
| 5,584,315 A | 12/1996 | Powell |
| 5,586,571 A | 12/1996 | Guillermo |
| 5,669,405 A | 9/1997 | Engelmann |
| 5,709,240 A | 1/1998 | Martin et al. |
| 5,711,341 A | 1/1998 | Funderburk et al. |
| 5,713,240 A | 2/1998 | Engelmann |
| 5,794,655 A | 8/1998 | Funderburk et al. |
| 5,901,735 A | 5/1999 | Breda |
| 5,918,623 A | 7/1999 | Hidessen |
| 5,947,152 A | 9/1999 | Martin et al. |
| 5,950,653 A | 9/1999 | Folsom |
| 5,992,441 A | 11/1999 | Enge et al. |
| 6,021,805 A | 2/2000 | Horne et al. |
| 6,123,095 A | 9/2000 | Kersten et al. |
| 6,155,291 A | 12/2000 | Powell |
| 6,170,510 B1 | 1/2001 | King et al. |
| 6,196,246 B1 | 3/2001 | Folsom |
| 6,234,180 B1 | 5/2001 | Davis et al. |
| 6,343,618 B1 | 2/2002 | Britt et al. |
| 6,349,736 B1 | 2/2002 | Dunmire |
| 6,374,849 B1 | 4/2002 | Howell |
| 6,378,550 B1 | 4/2002 | Herndon et al. |
| 6,443,184 B1 | 9/2002 | Funderburk |
| 6,471,249 B1 | 10/2002 | Lewis |
| 6,513,543 B1 | 2/2003 | Noll et al. |
| 6,546,946 B2 | 4/2003 | Dunmire |
| 6,581,626 B2 | 6/2003 | Noll et al. |
| 6,659,126 B2 | 12/2003 | Dunmire et al. |
| 6,675,110 B2 | 1/2004 | Engelmann |
| 7,051,763 B2 | 5/2006 | Heren |
| 7,114,418 B1 | 10/2006 | Allen |
| 7,434,593 B2 | 10/2008 | Noll et al. |
| 7,506,395 B2 | 3/2009 | Eldridge |
| 7,784,483 B2 | 8/2010 | Grable et al. |
| 7,934,515 B1 | 5/2011 | Towsley et al. |
| 8,220,839 B2 | 7/2012 | Hall |
| 8,997,772 B2 | 4/2015 | Noll et al. |
| 9,091,360 B2 | 7/2015 | Frahm |
| 9,539,400 B2 | 1/2017 | Gumaste et al. |
| 9,546,475 B2 | 1/2017 | Lu |
| 9,899,819 B1 | 2/2018 | Holloway |
| 9,995,605 B2 | 6/2018 | Konno et al. |
| 10,132,425 B2 | 11/2018 | Di Monte |
| D876,585 S | 2/2020 | Li et al. |
| 10,561,874 B2 | 2/2020 | Williams et al. |
| D886,236 S | 6/2020 | Pfund et al. |
| 10,719,904 B2 | 7/2020 | Yasumuro et al. |
| D908,191 S | 1/2021 | Li et al. |
| 10,883,893 B2 | 1/2021 | Shaw et al. |
| 10,914,412 B2 | 2/2021 | Doughty et al. |
| 10,962,143 B2 | 3/2021 | Cis et al. |
| D917,013 S | 4/2021 | Pfund et al. |
| D919,048 S | 5/2021 | Li et al. |
| D919,049 S | 5/2021 | Li et al. |
| D928,916 S | 8/2021 | Shim |
| 11,137,082 B2 | 10/2021 | Okuno et al. |
| D941,426 S | 1/2022 | Downing et al. |
| D957,587 S | 7/2022 | Downie et al. |
| D958,937 S | 7/2022 | Pfund et al. |
| 2002/0043282 A1 | 4/2002 | Horne et al. |
| 2002/0078801 A1 | 6/2002 | Persechino |
| 2003/0000577 A1 | 1/2003 | Noll et al. |
| 2003/0168105 A1 | 9/2003 | Funderburk |
| 2004/0045604 A1 | 3/2004 | Dunmire et al. |
| 2004/0107993 A1 | 6/2004 | Stephens |
| 2005/0092364 A1 | 5/2005 | Furuya et al. |
| 2005/0199291 A1 | 9/2005 | Price et al. |
| 2006/0076062 A1 | 4/2006 | Andersson |
| 2006/0196542 A1 | 9/2006 | Yen |
| 2007/0181191 A1 | 8/2007 | Wittig et al. |
| 2007/0193633 A1 | 8/2007 | Howell et al. |
| 2007/0204916 A1 | 9/2007 | Clayton et al. |
| 2007/0204917 A1 | 9/2007 | Clayton et al. |
| 2007/0240765 A1 | 10/2007 | Katzman et al. |
| 2008/0145739 A1 | 6/2008 | Adams et al. |
| 2008/0289567 A1 | 11/2008 | Gordon |
| 2009/0136935 A1 | 5/2009 | Petersen |
| 2009/0194719 A1 | 8/2009 | Mulligan |
| 2011/0067225 A1 | 3/2011 | Bassaco |
| 2011/0309076 A1 | 12/2011 | Liebenberg et al. |
| 2012/0248759 A1 | 10/2012 | Feith |
| 2013/0026743 A1 | 1/2013 | Baca |
| 2013/0255452 A1 | 10/2013 | Kovach |
| 2014/0109986 A1 | 4/2014 | Cordes |
| 2015/0260310 A1 | 9/2015 | Bahalul |
| 2017/0023141 A1 | 1/2017 | Andersson |
| 2017/0234441 A1* | 8/2017 | Fuller ..................... F16K 47/00 137/527 |
| 2018/0156488 A1 | 6/2018 | Stanley et al. |
| 2019/0043157 A1 | 2/2019 | Yasumuro et al. |
| 2019/0136935 A1 | 5/2019 | Hulstein et al. |
| 2019/0162341 A1 | 5/2019 | Chiproot |
| 2019/0271428 A1 | 9/2019 | O'Connor et al. |
| 2019/0323618 A1 | 10/2019 | Fletcher et al. |
| 2020/0141612 A1 | 5/2020 | Thibodeaux |

(56) References Cited

U.S. PATENT DOCUMENTS

| | | |
|---|---|---|
| 2020/0370677 A1 | 11/2020 | Mendez |
| 2021/0172157 A1 | 6/2021 | Burke et al. |
| 2021/0230850 A1 | 7/2021 | Bouchard et al. |
| 2021/0332898 A1 | 10/2021 | Cellemme |
| 2022/0049487 A1 | 2/2022 | Bouchard et al. |
| 2022/0049786 A1 | 2/2022 | Doughty |
| 2022/0412474 A1 | 12/2022 | Bouchard et al. |
| 2023/0228067 A1 | 7/2023 | Bouchard |

FOREIGN PATENT DOCUMENTS

| | | |
|---|---|---|
| DE | 8525261 U1 | 11/1985 |
| DE | 202014102566 U1 | 8/2014 |
| DE | 202014102568 U1 | 9/2015 |
| EP | 1521004 A1 | 4/2005 |
| EP | 3434833 A1 | 1/2019 |
| EP | 3832183 A1 | 6/2021 |
| FR | 2928750 A1 | 9/2009 |
| GB | 1231579 A | 11/1967 |
| JP | 2002213629 A | 7/2002 |
| WO | 2003060459 A1 | 7/2003 |
| WO | 2020023584 A1 | 1/2020 |

OTHER PUBLICATIONS

Watt TK-99E Backflow Preventer Test Kit Product Specifications and Test Information, IS-TK99E 0829, 2009, 4 pages.
Zurn Wilkins 300AR Series, Backflow Preventor Order Form No. 480-060, 4117, 2 pages.
Watts Water Technologies Company, Installation, Maintenance & Repair Series 909, LF909, 909RPDA, LF909RPDA, 2016, 8 pages.
Watts Water Company, Series 909RPDA for Health Hazard Applications, 2016, 4 pages.
Watts Regulator Co., Watts ACV 113-6RFP Flood Protection Shutdown Valve for Health Hazard Applications, 2020, 4 pages.
European Search Report for European Patent Application No. 20192133.5 dated Feb. 1, 2021 , 9 pages.
Ames Fire & Waterworks, division of Watts Industries, F-A-Spools/Flanges, 2001, 4 pages.
Watts, S-RetroFit-Simple, 2017, 2 pages.
Apollo Valves, Apollo backflow preventer in-line "R" retrofit series, 2 pages.
*Zurn Industries, LLC* vs. *Conbraco Industries, Inc.*, Complaint for patent infringement, United States District Court for the Center District of California Western Division, Case No_ 2.16-CV-5656, Jul. 29, 2016; 5 pages.
Wilkins Company, Model 375/475MS Series, Installation, Maintenance and Instruction Sheet, 2006, 1 page.
Wilkins Model 420 XL Lead-Free pressure Vacuum Breakers 1/2', 3/4', and 1', pp. 60-70.
Apollo Valves PVB4A Series Installation, Operation and Maintenance Manual for Model PVB4A 1/2'-2' Pressure Vacuum Breaker Backflow Preventer, dated Jan. 11, 2012, 12 pages.
Apollo Valves PVB4A Series Installation, Operation, and Maintenance Manual, copyright May 2009, 9 pages.
Watts Water Technologies Company Brochure ES LF800M4QT for Health Hazard Applications Lead Free Series LF8 M4QT Anti-Siphon Vacuum Breakers Sizes 1/2'-2', copyright 2013, 4 pages.
Conbraco BFMMPVB Maintenance Manual for Series 4V-500 1/2'-2' Pressure Type Vacuum Breaker, Apr. 2002, Conbraco Industries, Inc., Matthews, North Carolina 28106, 6 pages.
Watts, "Double Check Valve Assembly Backflow Preventers, Bronze," Article 1, 2021, 6 pages.
Watts, "Reduced Pressure Zone Assembly Backflow Preventers, Bronze Body, Sizes 1/4-2 In," Article 1, 2021, 16 pages.
Miscellaneous Communication issued in European patent application No. 20211811.3, dated Apr. 5, 2021, 8 pages.
Office Action issued in corresponding Chinese patent application No. 20201920527.3, dated Mar. 10, 2010, 1 page (translation unavailable).
International Search Report and Written Opinion issued in corresponding international patent application No. PCT/US2021/046208, dated Dec. 1, 2021, 8 pages.
Zurn Wilkins 300AR Series, Backflow Preventor Order Form No. 480-060, Apr. 2017, 2 pages.
Apollo Valves, Apollo backflow preventer in-line "R" retrofit series, dated Jul. 29, 2016, 2 pages.
Wilkins Model 420 XL Lead-Free pressure Vacuum Breakers 1/2', 3/4', and 1' (date unknown), 2 pages.
International Search Report and Written Opinion issued in corresponding International Patent Application No. PCT/US2021/062395, dated Feb. 23, 2022, 14 pages.
International Search Report and Written Opinion issued in corresponding International Patent Application No. PCT/US2021/046101, dated Nov. 22, 2021, 8 pages.
Extended European Search Report received for European Patent Application No. 20211811.3, dated May 4, 2021, 2 pages.
Watts Regulator Co. 0887224 Series 909 Reduced Pressure Zone Assemblies Relief/Check Valve Kits 2 1/2"-10", site visited Jul. 19, 2023; URL: https://controlscentral.com/tabid/63/ProductID/315241/watts-regulator-0887224-series-909-reduced-pressure-zone-assemblies-relief.aspx (Year: 2023).

\* cited by examiner

CHECK VALVE CARTRIDGE WITH FLOW GUIDE FOR COMPACT BACKFLOW PREVENTION ASSEMBLY

CROSS-REFERENCE

This application claims priority to U.S. Provisional Patent Application Ser. No. 63/066,411, filed Aug. 17, 2020, which is incorporated herein by reference.

FIELD OF THE DISCLOSURE

The subject disclosure relates to valves and backflow prevention assemblies, and more particularly to valves and backflow prevention assemblies having a compact length with a pressure stabilizing flow guide.

BACKGROUND

In many water systems, backflow prevention (BFP) assemblies allow fluid and even solids to flow only in a desired, i.e., a forward, direction. As backsiphonage or backflow can present contamination and health problems, the backflow prevention valves and assemblies prevent flow in an undesired direction, i.e., a backward or reverse direction. BFP assemblies are installed in buildings, such as residential homes, and commercial buildings and factories, to protect public water supplies by preventing the reverse flow of water from the buildings back into the public water supply.

A typical BFP assembly includes an inlet shutoff valve and an outlet shutoff valve with a backflow prevention valve assembly extending between the inlet and outlet shutoff valves. Many different configurations of BFP assemblies are commercially available, each being differently configured.

Owing to the fact that BFP assemblies are important for water safety, BFP units are tested annually, often per government regulations, to assure proper operating condition. Specifically, fluid pressure measurements are taken at specified locations in the BFP unit. If it is determined that a check valve needs to be repaired or replaced, the inlet and outlet shutoff valves have to be closed, the check valve fixed and tested, the shutoff valves opened and the apparatus confirmed to be operating per any required ordinances and/or standards. The process is time-consuming and the steps have to be performed in the correct sequence and manner in order to not contaminate the public water supply, inadvertently flood an area, and return the BFP assembly to working order.

Examples of BFP assemblies are shown in U.S. Pat. No. 4,244,392 issued on Jan. 13, 1981 to Griswold et al., U.S. Pat. No. 4,489,746 issued on Dec. 25, 1984 to Daghe et al. and U.S. Pat. No. 5,566,704 issued on Oct. 22, 1996 to Ackroyd et al., each of which is incorporated herein by reference. These references disclose BFP assemblies with undue length and flow turbulence despite having inclined barrels such as the barrels shown in U.S. Pat. No. 4,244,392. Additionally, these BFP assemblies can be difficult to manufacture, assemble and repair.

SUMMARY

From time to time, various components of a BFP assembly may need replacement, which is not only difficult and time consuming but results in downtime for the fluid network. A check valve cartridge assembly that is easier to manufacture, assemble and install as well as more robust would reduce: the difficulty of fabrication and repair; repair time; assembly error from improper fabrication or otherwise; and the difficulty of installation. Further, a more compact and functional cartridge assembly and BFP assembly would save space and materials cost. Still further, a BFP assembly that has minimal pressure drop would be an advancement in performance. Additionally, a standardized check valve cartridge assembly that can be utilized with different diameter systems would advantageously simplify tooling, manufacturing and repair. The subject technology provides some or all of these benefits along with reducing the required components.

The subject technology is directed to a valve assembly having a body forming a bucket having a sidewall extending between an open end and a closed end along a bucket axis. A first conduit and a second conduit extend from the sidewall, wherein the first and the second conduits extend along a conduit axis that is perpendicular to the bucket axis. A frame inserts into the bucket along the bucket axis and includes a valve seat and a valve member biased against the valve seat. A guide is provided in the bucket between the closed end and the frame and extends along a guide axis between a first opening arranged in a first plane and aligned to receive fluid flow from the first conduit and a second opening arranged in a second plane and aligned to direct fluid flow through the valve seat. The first and second planes are not parallel to one another. The guide may be unitarily formed with the frame or unitarily formed with the closed end of the bucket. In one embodiment, the first opening of the guide is convex and the second opening of the guide is circular. The second plane of the guide can intersect the bucket axis at an angle other than 90°. Preferably, a cross-sectional area of the first opening of the guide is unequal to a cross-sectional area of the second opening of the guide but the second opening of the guide is matched in size and shape to an opening formed by the valve seat. The guide advantageously forms a smooth transition area from the first opening to the second opening.

In another embodiment, the guide is separately formed from the frame and body, the guide including at least one ridge and at least one standoff for positioning the guide in the bucket. The valve assembly can further comprise a second bucket having: a sidewall extending between an open end and a closed end along a second bucket axis; a third conduit in fluid communication with the second conduit of the at least one bucket; and a fourth conduit, wherein the third and fourth conduits extends along the conduit axis that is generally perpendicular to the second bucket axis. A second frame inserts into the second bucket along the second bucket axis and includes a second valve seat and a second valve member biased against the second valve seat, wherein the second valve seat forms a valve opening. A second guide is in the second bucket between the closed end and the second frame, wherein the second guide has an inlet in fluid communication with the third conduit and gradually transitions to an outlet matched in size, shape and orientation to the valve opening, and the fourth conduit gradually transitions to a smaller flow path.

The subject technology is also directed to a kit for a backflow prevention (BFP) assembly including a standard check valve cartridge for mounting in a bucket formed by a body of the BFP assembly along a bucket axis. The standard check valve cartridge forms a valve seat opening, wherein the bucket has an inlet along a flow axis that is perpendicular to the bucket axis. A plurality of flow guides can direct flow from the inlet to the valve seat opening, each flow guide having an inlet opening of a different size, an outlet opening matched in size and shape to the valve seat opening, and a smooth transition from the inlet opening to the outlet opening. The valve seat opening may be perpendicular or tangential to the flow axis. Preferably, the inlet opening is circular and varies from 0.5 to 3.0 inches in diameter. At least one of the plurality of flow guides includes a ridge and standoffs for positioning the at least one of the plurality of flow guides between the standard check valve cartridge and the bucket.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figure 1:
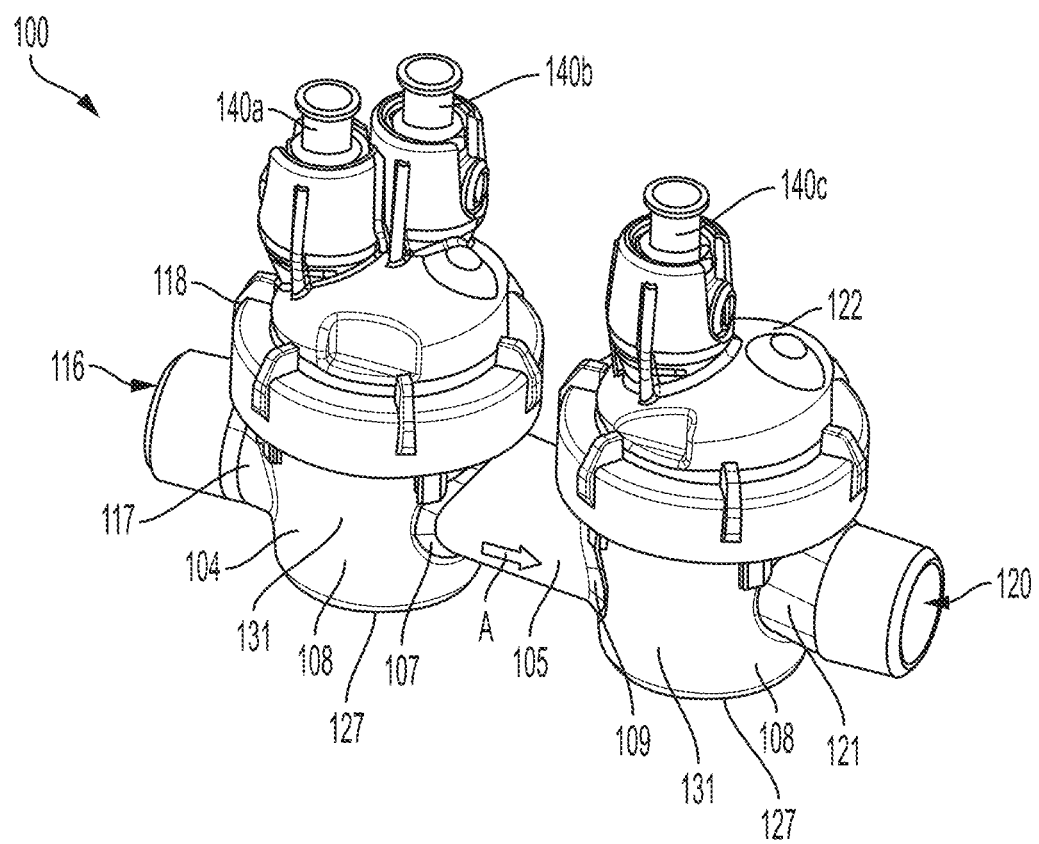
FIG. 1 is a perspective view of a backflow prevention (BFP) assembly in accordance with the present disclosure.

The subject technology overcomes many of the prior art problems associated with backflow prevention assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Referring now to FIG. 1, there is shown a backflow prevention (BFP) assembly 100 in accordance with an aspect of the present disclosure. The BFP assembly 100 may be installed in a fluid system, e.g., a water supply for a building. In normal operation, the backflow prevention assembly 100 operates to carry fluid in only a forward direction, e.g., left to right in FIG. 3 and as denoted by arrow indicia "A", from an inlet 116 to an outlet 120. The BFP assembly 100 operates to prevent flow in a backward direction, i.e., a direction from right to left in FIG. 3.

The BFP assembly 100 includes a body 104 forming an upstream bucket 108 and a downstream bucket 108. Each bucket 108 has a sidewall 131 forming a chamber 111 (see FIG. 2A) enclosed by a test cover 118, 122. The test covers 118, 122 may include one or more test cocks 140a-c for sensing pressure at various locations within the BFP assembly 100. The downstream test cover 118 includes two test cocks 140a, 140b and the upstream test cover 122 includes a single test cock 140c but the test covers 118, 122 are otherwise very similar.

The body 104 forms an inlet conduit 117 from the inlet 116 to the sidewall 131 of the upstream bucket 108 and an outlet conduit 121 from the sidewall 131 of the downstream bucket 108 to the outlet 120. The body 104 also forms a transition neck conduit 105 between the sidewalls 131 of the buckets 108. At the upstream bucket 108, the transition conduit 105 forms an outlet 107 for the upstream bucket 108 and at the downstream bucket 108, the transition conduit 105 forms an inlet 109 for the downstream bucket 108. Thus, the valve body 104 forms two bucket chambers 111 with sidewall inlets 109, 116 and sidewall outlets 107, 120. The BFP assembly 100 is normally closed. Water flow passes from the inlet 109 to the outlet 120 and consecutively through each of the buckets 108.

Figure 2A:
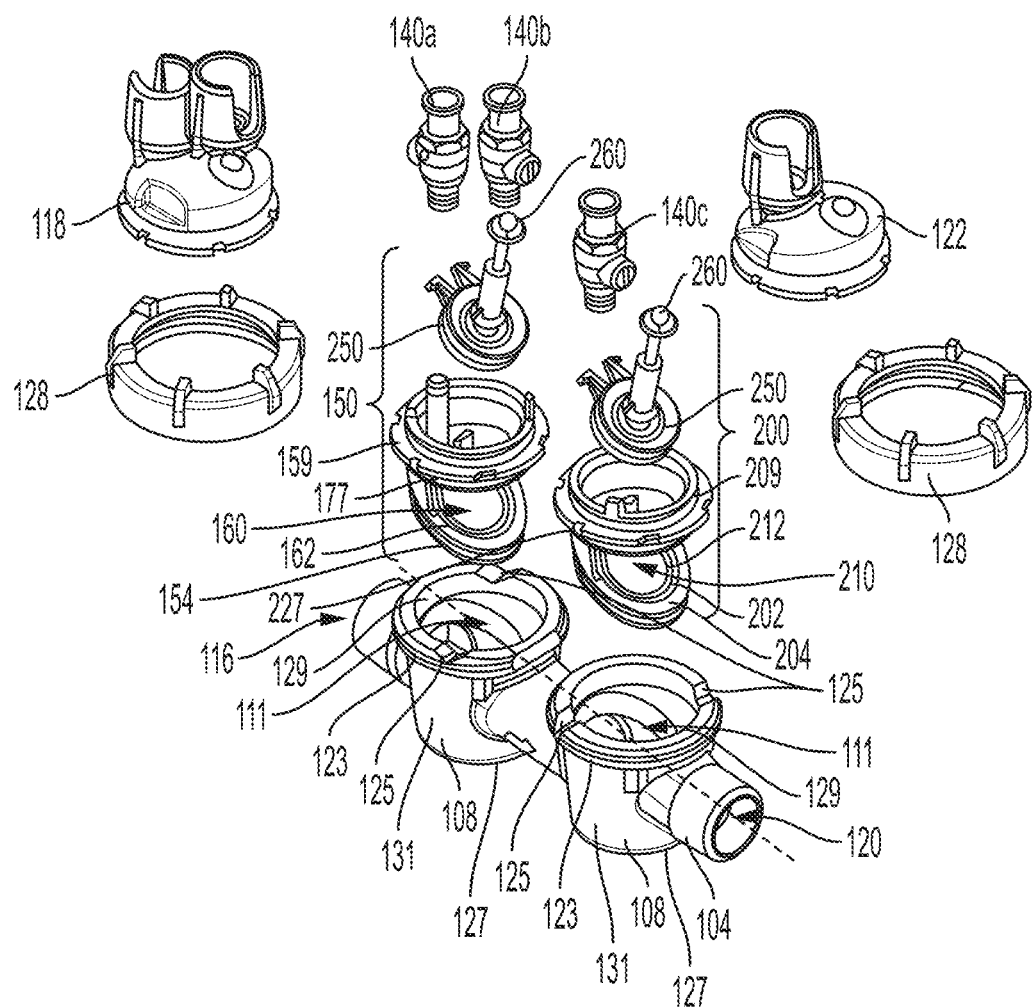
FIG. 2A is an exploded view of the BFP assembly of FIG. 1.
Figure 2B:
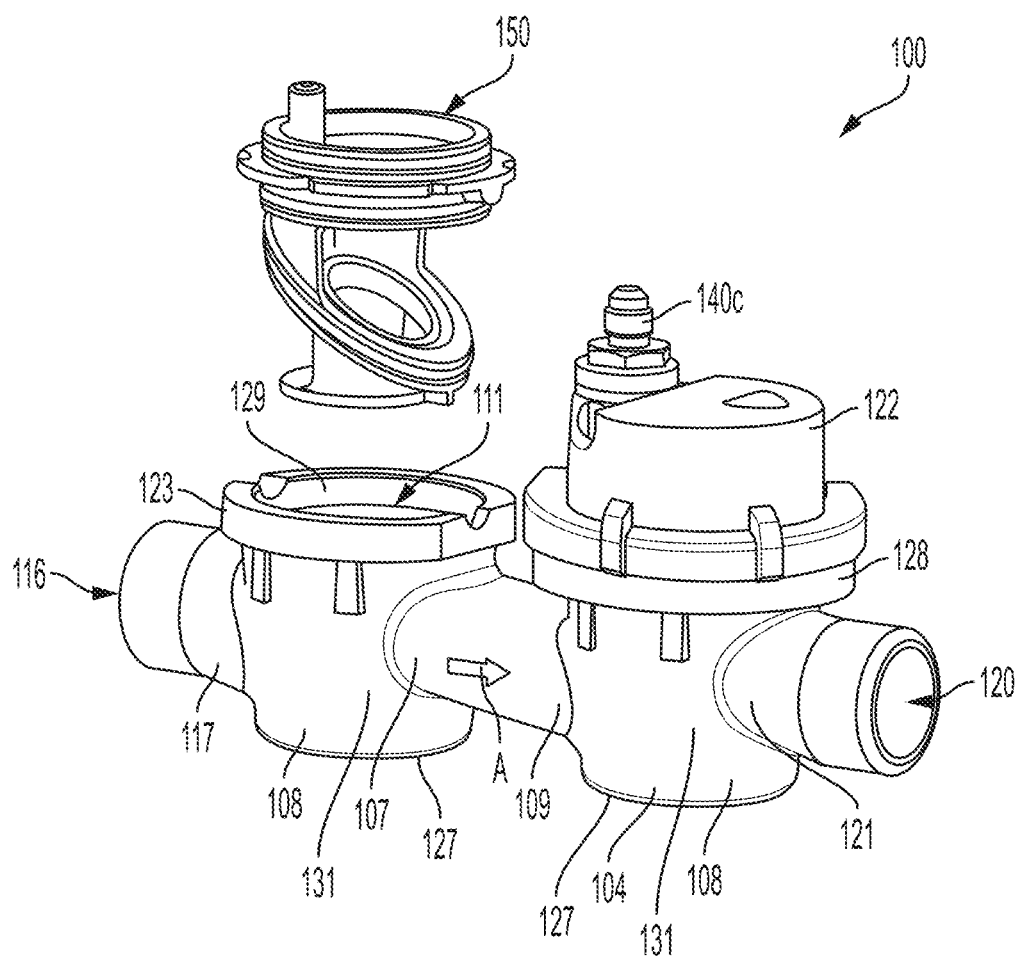
FIG. 2B is a partially exploded view of the BFP assembly of FIG. 1.
Figure 3:
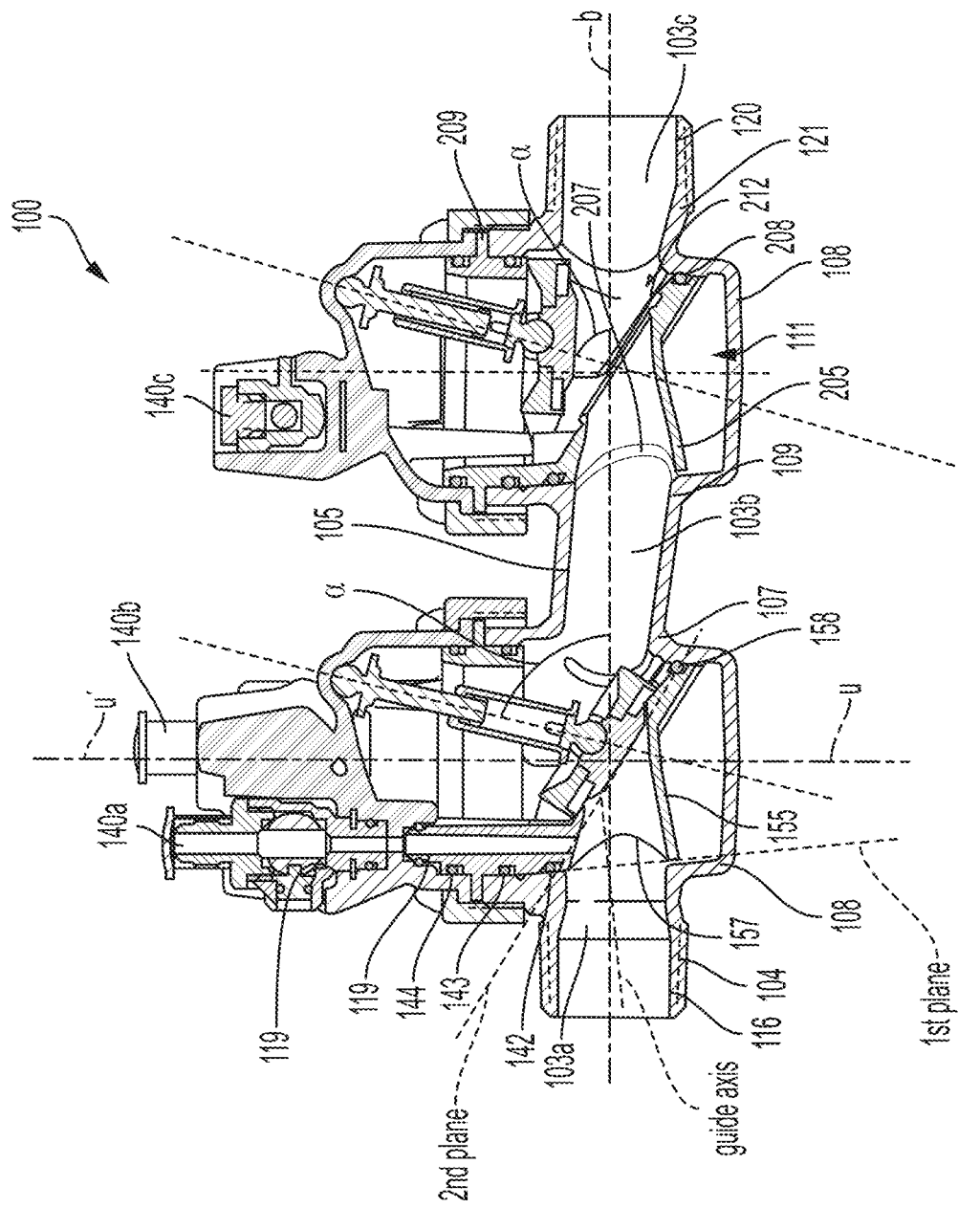
FIG. 3 is cross-sectional view of the BFP assembly of FIG. 1.
Figure 4:
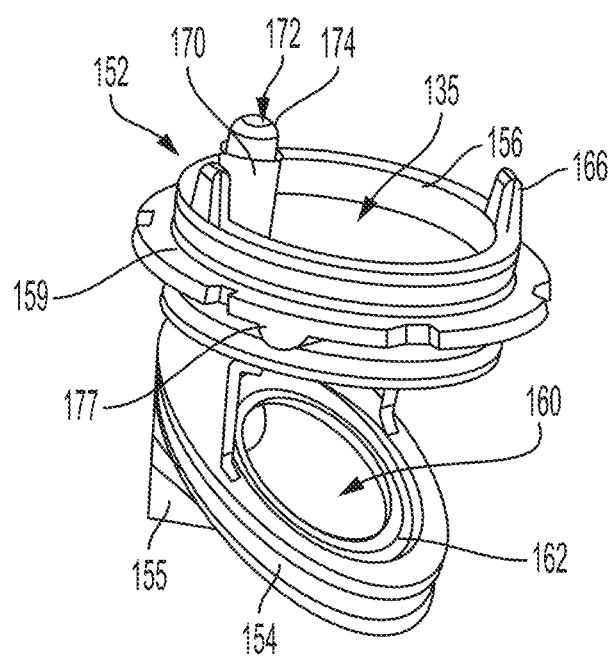
FIG. 4 is a top perspective view of a dual test cock frame for a check valve cartridge assembly for a BFP assembly in accordance with the present disclosure.
Figure 6:
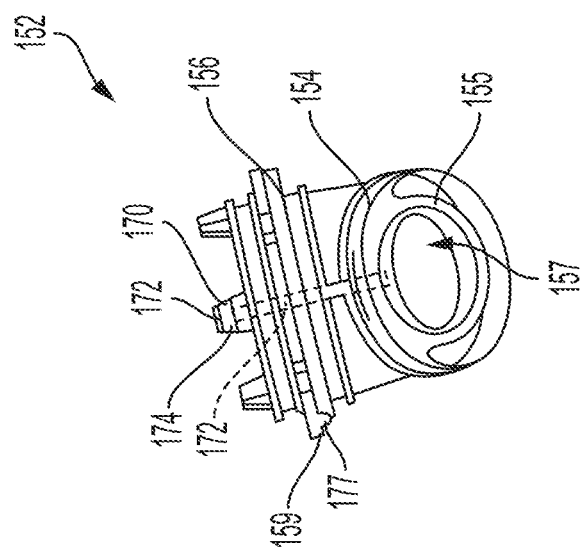
FIG. 6 is a bottom perspective view of the frame of FIG. 4.

Referring now to FIGS. 2A, 2B and 3, exploded views and a cross-sectional view of the BFP assembly 100 of FIG. 1 are shown. The BFP assembly 100 has an upstream cartridge assembly 150 and a downstream cartridge assembly 200 that fit within the respective bucket 108 to create check valves for selectively opening and closing flow through the body 104. The cartridge assemblies 150, 200 mount vertically (e.g., perpendicular to the flow axis "b", see FIG. 3) in the bucket chambers 111. To form the chambers 111, each bucket 108 has a closed end 127 and an open end 129. The upstream cartridge assembly 150 creates a single zone chamber 111 and the downstream cartridge assembly 200 creates a dual zone chamber 111.

More particularly, each cartridge assembly 150, 200 has a frame 152, 202 with an integral flow guide 154, 204 and an upper portion 156, 206. The integral flow guides 154, 156 are unitarily formed with the upper portions 204, 206. The integral flow guides 154, 204 carry an o-ring 158, 208 that seals against the bucket 108 so that all fluid flow passes through an opening 160, 210 formed in the respective integral flow guide 154, 204. The openings 160, 210 may be circular but are oval as shown to create a relatively larger flow path. The frames 152, 202 are different as discussed in more detail below with respect to FIGS. 4-8.

Each cartridge assembly 150, 200 includes an interchangeable valve member 250 mounted to the frame 152, 202. The valve member 250 selectively closes on to a valve seat 162, 212 surrounding the opening 160, 210. When the valve member 250 seals against the valve seat 162, 212, the check valve cartridge assembly 150, 200 is closed. Each cartridge assembly 150, 200 includes a spring bias assembly 260 to normally urge each valve member 250 in to the closed position. However, the closing force of the spring bias assembly 260 is typically overcome by normal pressure of the flowing fluid. The spring bias assembly 260 extends between the valve member 250 and the respective test cover 118, 122. The swing check design can advantageously have wide flow path, which helps to enable relatively lower pressure drop.

When the cartridge assemblies 150, 200 are closed, the BFP assembly 100 creates three different pressure zone 103a-c. The upstream zone 103a is basically at the source pressure and extends up to the first valve seat 162. The intermediate zone 103b is between the valve seats 162, 212. The downstream zone 103c is basically at the output pressure and extends from the second valve seat 212. Test cocks 140a-c sense the pressure in each zone 103a-c, respectively.

Still referring to FIGS. 2A, 2B and 3, to assembly the BFP assembly 100, the cartridge assemblies 150, 200 are placed in the buckets 108. The upper portions 156, 206 of the frames 152, 202 include hardstop rings 159, 209. The hardstop rings 159, 209 seat against the buckets 108 to set a depth of insertion. The hardstop rings 159, 209 also include depending tabs 177, 227 that rest in grooves 125 formed in threaded portions 123 of the buckets 108. As the tabs 177, 227 and the grooves 125 for each bucket are different, assembly of the wrong cartridge assembly 150, 200 in the wrong bucket 108 is prevented.

Once the cartridge assemblies 150, 200 are in place within the buckets 108, the test covers 118, 122 enclose the buckets 108 while creating a stop for the spring bias assembly 260. In other words, the spring bias assemblies 260 extend from the respective test cover 118, 122 to push against the valve member 250. A coupling ring 128 screws on to a threaded portion 123 of each bucket 108 to secure the components 118, 122, 150, 200 in place. The coupling rings 128 are designed to be hand tightened.

Figure 5:
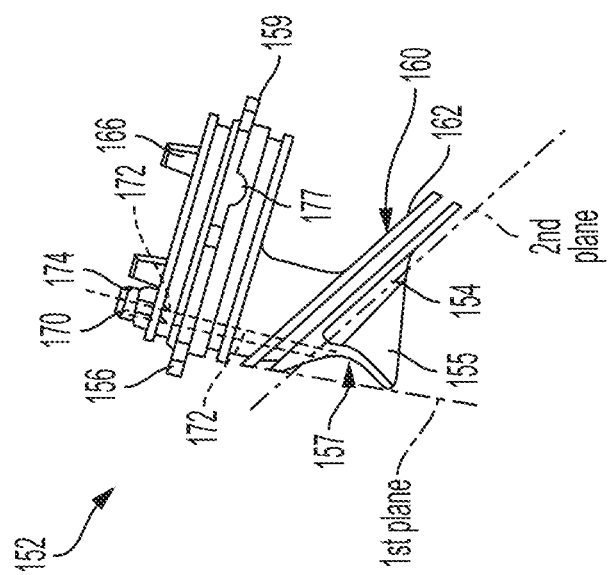
FIG. 5 is a side view of the frame of FIG. 4.

Referring now to FIGS. 4-8, various views of a dual test cock frame 152 are shown. The integral flow guide 154 has a wedge-shaped funnel portion 155 that forms a side inlet port or opening 157. Preferably, the size and shape of the inlet opening 157 matches up with and aligns to the inlet conduit 117 and the body inlet 116 to receive fluid passing therethrough. The opening 157 may be convex as best seen in FIG. 5. The integral flow guide 154 directs flow through the opening 160 by having a smooth transition area 161. As a result, the integral flow guide 154 creates a streamlined flow path that directs the incoming fluid flow through the valve seat 162 resulting in a reduced pressure drop. The integral flow guide 154 sets flow through the opening 160 at an angle α to the overall direction of flow as shown by conduit or flow axis line "b" in FIG. 3.

The integral flow guide 154 forms an entry or first plane defined by capturing points on the inlet opening 157. The first plane may be perpendicular to the flow axis "b" or at an angle as shown. Similarly, the integral flow guide 154 forms an exit or second plane defined by capturing points on the opening 160. The second plane may be perpendicular to the bucket axis U-U', which is perpendicular to the flow axis "b," or at an angle as shown. The first and second planes are not parallel. In another embodiment, the bucket axis is at forty-five degrees to the flow axis but the integral flow guide 154 still smoothly transitions flow from the conduit through the valve seat opening. It is envisioned that the inlet opening 157 and the opening 160 can vary greatly in size and be different sizes. For example, the conduits 105, 117, 121 may be 0.5 to 3 inches in diameter but the valve seat opening 160 may be 3 inches in diameter or larger. As such, an area of the inlet opening 157 might be much less than the area of the opening 160.

Turning to the upper portion 156 of the frame 152, the upper portion 156 carries a second o-ring 143 that seals against the body 104 and a third o-ring 144 that seals against the test cover 118. The frame 152 also has optional opposing upstanding handles 166 to facilitate manual insertion and removal of the cartridge assembly 150 from the bucket 108. An upper aperture 135 lets the spring bias assembly 260 extend upward past the frame 156. The upper aperture 135 also lets the intermediate zone 103b extend up against the test cover 118. The test cock 140b mounts in the test cover 118 to be in fluid communication with the intermediate zone 103b. As a result, the test cock 140b can provide a signal indicative of the pressure in the intermediate zone 103b.

To acquire a signal indicative of the pressure in the upstream zone 103a, the frame 156 has a shaft 170 with a central lumen 172. The shaft 170 extends from the integral flow guide 154 up above the hard stop ring 159 and terminates in a nipple 174. The test cover 118 has a port 119 that couples to the nipple 174 for allowing fluid communication from the lumen 172 to the test cock 140a, which is also installed in the port 119. At the integral flow guide 154, the central lumen 172 terminates below the valve seat 162 in the upstream zone 103a. In one embodiment, the central lumen 172 passes through the integral flow guide 154 and terminates at or near the inlet opening 157. Thus, the test cock 140a is in fluid communication with the upstream zone 103a.

Figure 9:
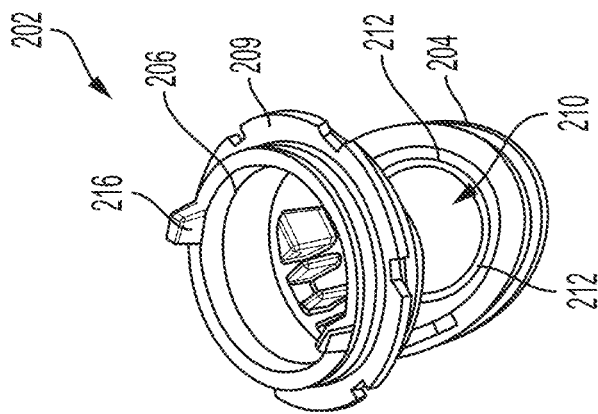
FIG. 9 is a top perspective view of a single test cock frame for a check valve cartridge assembly for a BFP assembly in accordance with the present disclosure.
Figure 8:
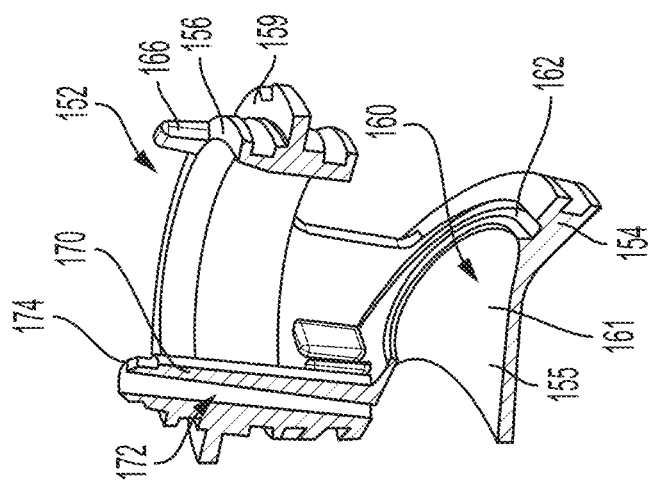
FIG. 8 is a cross-sectional view of the frame of FIG. 4.
Figure 7:
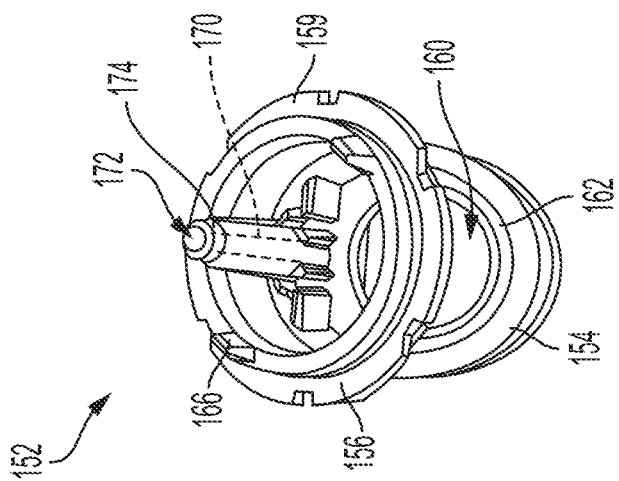
FIG. 7 is another top perspective view of the frame of FIG. 4.

Referring now to FIG. 9, a top perspective view of a single test cock frame 202 for a BFP assembly 100 in accordance with the present disclosure is shown. The single test cock frame 202 is similar to the dual test cock frame 152 but does not have a lumen 172. The similar parts are labeled with a reference numeral fifty digits higher. Preferably, the frames 152, 202 have similar silhouettes. The integral flow guide 204 also has a wedge-shaped funnel portion 205 that forms a side inlet port 207. The size and shape side port 207 matches up with and aligns to the inlet 109 of the body 108, which is aligned with the inlet 116. Again, the incoming fluid flow is directed to the valve seat opening 210, which is set at an angle α to the overall direction of flow as shown by axis line "b" in FIG. 3. By having the check valve assemblies not horizontally oriented like the flow direction, the resulting BFP assembly is very compact. Also, by having a dual zone test cover, the BFP assembly is further compacted.

To assemble the BFP assembly 100, the cartridge assemblies 150, 200 are assembled separately. The completed cartridge assemblies 150, 200 are pressed into the respective bucket 108 until the hard stop rings 159, 209 seat on to the bucket 108. The handles 172, 21 provide a nice hand grip and easy ability to rotate until the tabs 177, 227 are in the corresponding grooves 125 and the hard stop rings 159, 209 are properly seated against the buckets 108.

The respective test covers 118, 122 are then placed over the cartridge assemblies 150, 200. The coupling rings 128 are then tightly threaded on to the buckets 108 to fix the components in place. At this time, the test cocks 140a-c can be installed in the test covers 118, 122 but the test cocks 140a-c may also be pre-installed.

In normal operation, the force exerted by the respective spring retainer assembly 260 on the valve elements 250 is overcome by the pressure exerted by the fluid normally flowing from the inlet 116 to the outlet 120 so that both check valves 150 swing open. If, for example, there is a drop in pressure from the supply source, the upstream valve element 250 and/or the downstream valve 250 will close to prevent backflow contamination. Similarly, if the normal forward flow is interrupted, one or both of the valve elements 250 is urged in position to cover the valve seats 162, 212 to close the BFP assembly 100 and prevent backflow.

The test cocks 140a-c are used to verify proper operation during testing. In one non-limiting example of pressure-testing for compliance with certification requirements, a FEBCO® Series TK-1 Backflow Preventer Test Kit, available from Watts Regulator Co., can be used. An example of the steps involved in testing is found at least in U.S. Pat. No. 5,566,704, the entire contents of which is herein incorporated by reference for all purposes.

As can be seen upon review of the subject disclosure, it is much easier to create and assembly a vertical bucket chamber, which reduces the lay length of the BFP assembly. Still further, repair is also simplified by being able to fully preassemble the cartridge assembly, and conduct a complete swap without tools. Further, despite the vertical bucket chamber, the integral flow guide of the frame streamlines flow (e.g., no sudden transitions and minimal flow separation etc.) to avoid turbulence and undue pressure loss due to energy dissipation. For example, on a standard 1 inch diameter dual check valve backflow preventer, the pressure drop should not exceed 10 psi with a flow-rate of 50 gpm. The subject technology performs well within the necessary standards. Still further, the subject technology can be adapted to any kind of valve.

Figure 10:
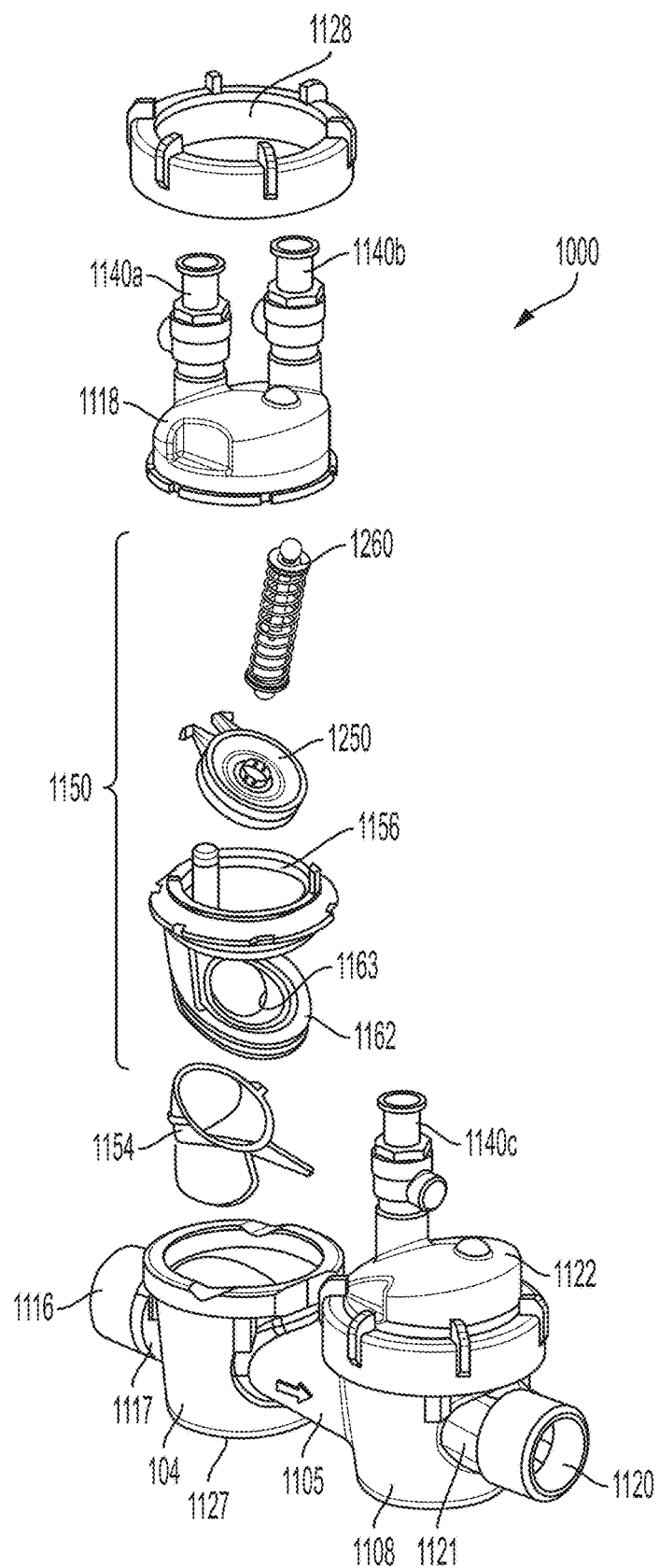
FIG. 10 is a partially exploded view of another backflow prevention (BFP) assembly in accordance with the present disclosure.
Figure 11:
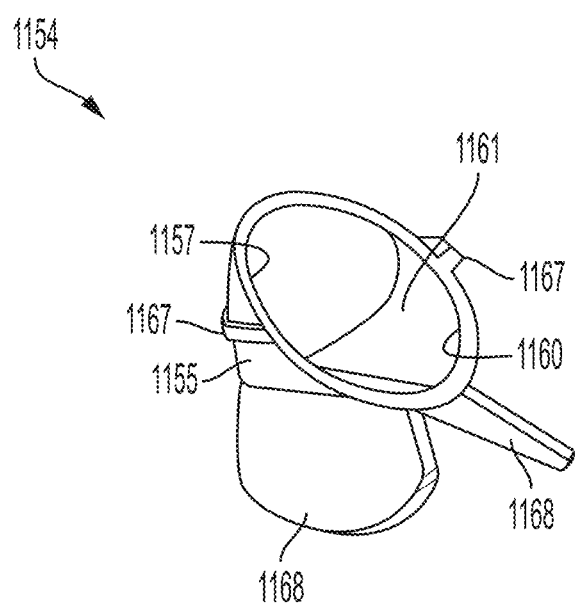
FIG. 11 is a perspective view of the flow guide of FIG. 10.
Figure 12:
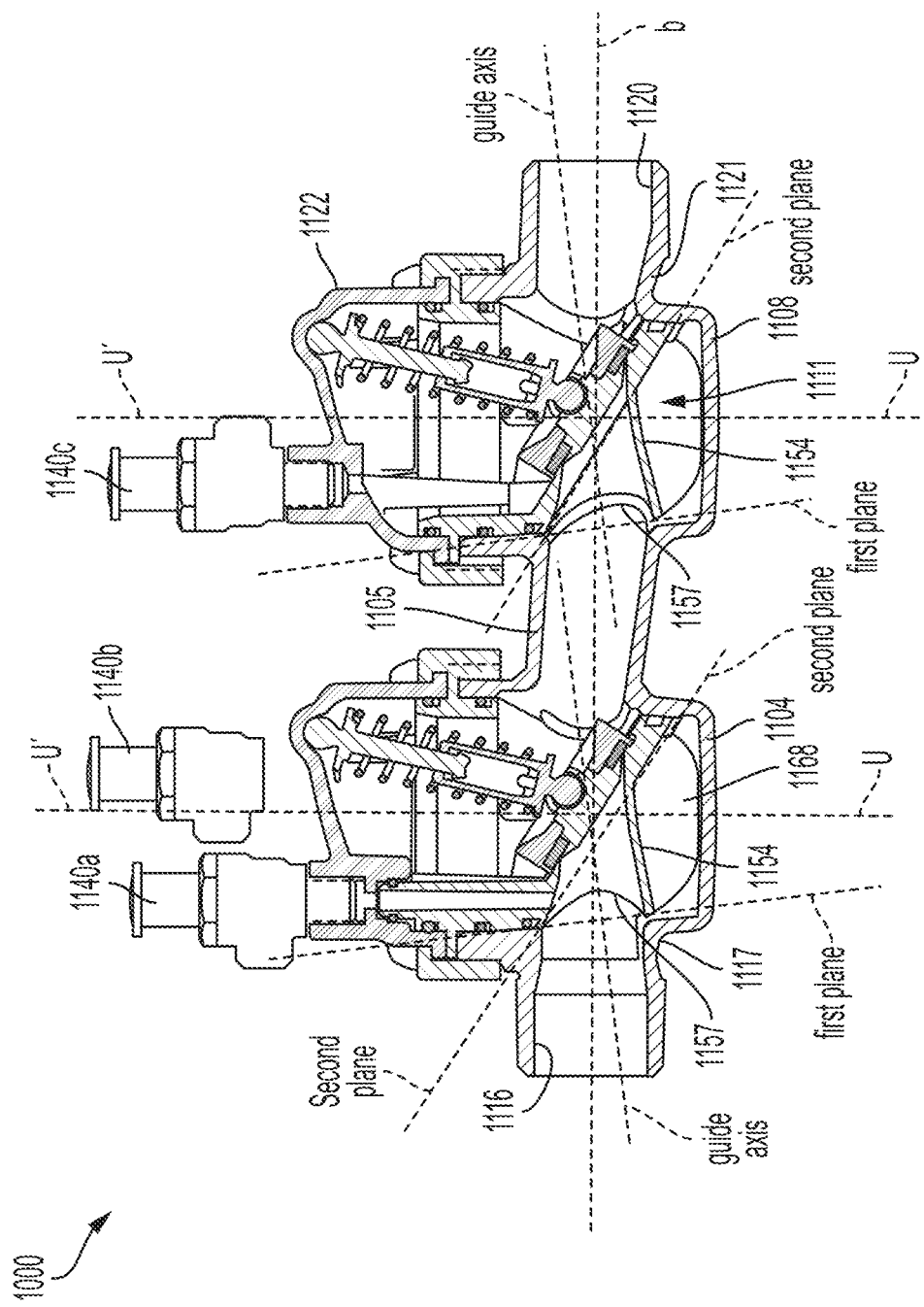
FIG. 12 is cross-sectional view of the BFP assembly of FIG. 10.

Referring now to FIGS. 10-12, another embodiment of a backflow prevention (BFP) assembly 1000 in accordance with the subject technology is shown. Similar elements to those described in connection with above-described embodiments are indicated with the like reference numbers in the "1000" series. Many elements are essentially the same as those of the foregoing embodiments and, thus, are not further described herein. The primary difference between BFP assembly 1000 is the modular flow guide 1154, which is not integral or unitarily formed with the upper portion 1156.

In brief overview, a separate modular flow guide provides all the streamlined flow benefits above plus the ability to adapt a standard large-flow check valve cartridge assembly to a variety of different diameter conduits. Flow guides can be formed to match up with a variety of differently sized inlet conduits while the valve seat opening in the standard check valve cartridge remains constant. These flow guides create a desirably streamlined flow to the valve seat opening so that the fluid jet spreads out across the entire opening of the check valve cartridge assembly even when the conduit is significantly smaller. During assembly, the standard check valve cartridge is simply used with the correct flow guide to match the BFP valve body. For example, the same check valve cartridge can be used for valves from 0.5 to 3 inches.

As best seen in FIG. 11, the modular flow guide 1154 has a wedge-shaped funnel portion 1155 that forms a side inlet opening 1157. Preferably, the size and shape of the inlet opening 1157 matches up with and aligns to the inlet conduit 1117 and/or the body inlet 1116 to receive fluid passing therethrough. The funnel portion 1155 directs flow through a second opening or guide outlet 1160 by having a smooth transition area 1161. The guide outlet 1160 is matched in size and shape as well as aligned to an opening 1163 formed in the valve seat 1162. As a result, the modular flow guide 1154 again creates a streamlined flow path that directs the incoming fluid flow through the valve seat 1162 resulting in a reduced pressure drop.

The modular flow guide 1154 also has outer ridges 1167. The body 1104 is cast with a groove (not shown) in the bucket 1108 near the closed end 1127 so that the flow guide 1154 can be manually press-fit into place by arranging the ridges 1167 into the groove. In a different embodiment, instead of snapping into a groove, the ridge 1167 is pressed under a lip or at least a partial ledge to be retained in the bucket 1108. The desired effect is that the ridge 1167 is captured in the bucket 1108 in a semi-permanent manner. The modular flow guide 1154 also has standoffs 1168 depending from funnel portion 1155 to help stabilize positioning of the flow guide 1154 in proper alignment. The depending standoffs 1168 act as legs so the flow guide 1154 sits underneath the cartridge assembly 1150. In another embodiment, the flow guide can just be snugly fit between the closed end of the bucket and the check valve cartridge assembly.

The modular flow guide can uniquely optimize the flow path for each different size system without any changes to the check valve cartridge assembly. Further, the tooling costs are reduced as the check valve cartridge assembly is standard across different diameter systems. The standard check valve cartridge assembly becomes a universal component to repair kits. As a result, the BFP assemblies are more likely to be efficiently repaired rather than cut out and replaced.

Figure 13:
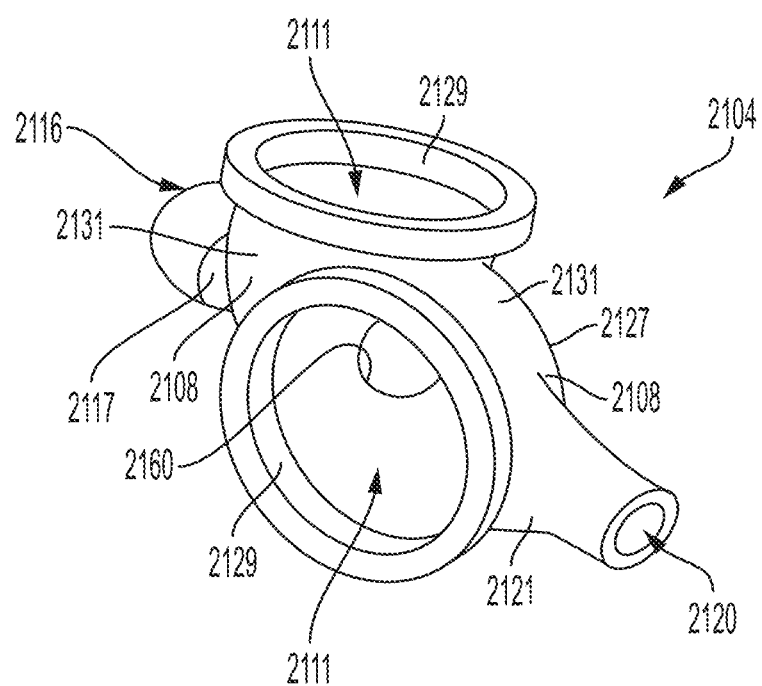
FIG. 13 is a perspective view of a body for another backflow prevention (BFP) assembly in accordance with the present disclosure.
Figure 14:
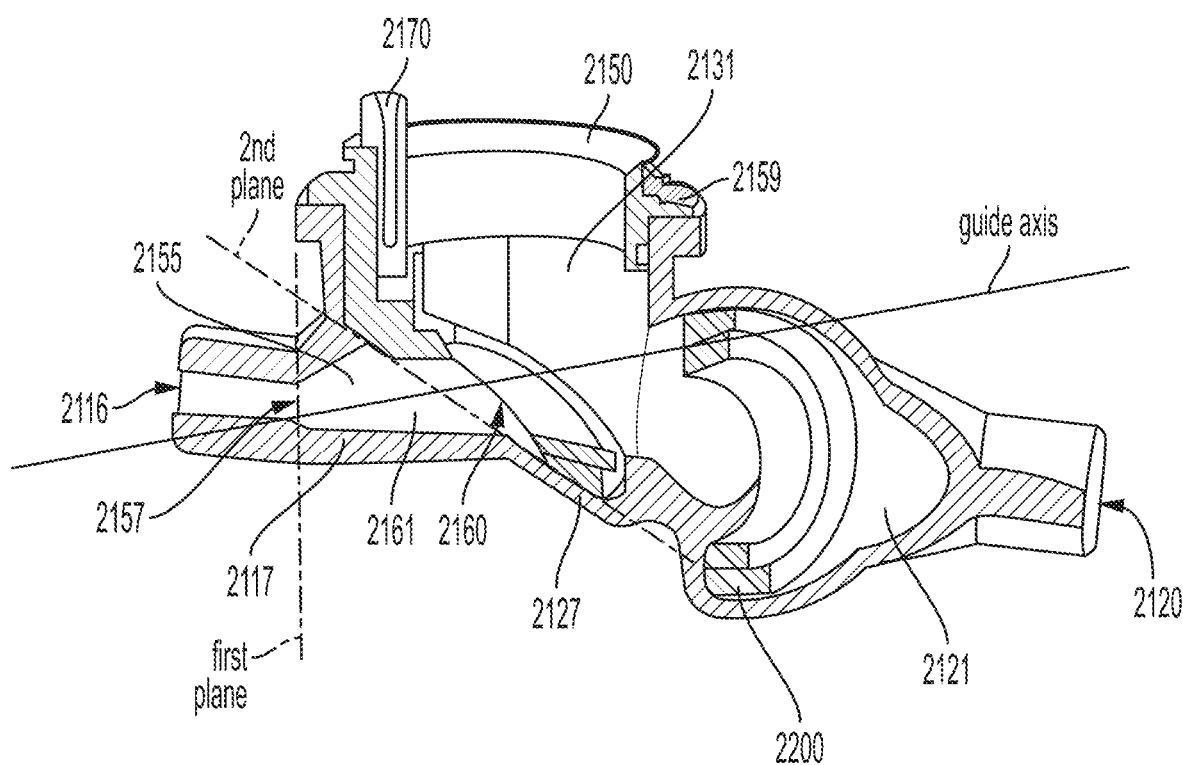
FIG. 14 is a cross-sectional view of a portion of a BFP assembly using the body of FIG. 13.

Referring now to FIGS. 13 and 14, a body 2104 in isolation and a portion of a backflow prevention (BFP) assembly using the body 2104 are shown, respectively. Similar elements to those described in connection with above-described embodiments are indicated with the like reference numbers in the "2000" series. Many elements are essentially the same as those of the foregoing embodiments and, thus, are not further described herein.

The primary difference of these components is that the flow guide funnel portion 2155 is integrally formed with the body 2104. By having the closed end 2127 of the buckets 2108 shaped to streamline the flow path, the flow path is more continuous. Again, the buckets 2108 are preferably sized and configured to receive a standard size cartridge assembly 2150 so that manufacturing is simplified and the repair personnel can simply stock a standard version of the cartridge assembly 2150. Further, the outlet conduit 2121 forms a streamlined, smooth funnel-shaped transition to the outlet 2120. By having the funnel portion 2155 formed in the body 2104, the overall assembly has not only fewer parts but the overall profile is smaller so less material (e.g., brass) is required when the body 2104 is formed. The flow guide funnel portion 2155 still forms first and second planes that are tangential and a guide axis that is at an angle to the flow axis.

As described above, the arrangement of body 2104 also reduces pressure drop across the resulting BFP assembly. The flow is guided smoothly to check valve cartridge assemblies installed at ninety degrees to the flow axis. The ninety-degree installation improves ease of maintenance and creates a shorter lay length. However, the flow path still avoids sudden transitions, flow separation, and injection of undue vertical momentum into the flow path which allows for a smaller overall body. This reduction of mixing and drag results in relatively less pressure drop across the BFP assembly. The injection of vertical momentum is reduced by the body 2104 creating a lead-in to the check valve seat that is tangential to the flow path instead of vertical, which reduces the dissipation of energy. As the lead-in is funnel shaped, the body 2104 creates strong jet coherence into both check valve cartridge assemblies. This is particularly advantageous for the flow path into the second check valve cartridge assembly as some pressure recovery occurs.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., check valves, valve elements, spring retention assemblies, and the like) shown as distinct for purposes of illustration can be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A valve assembly comprising:
   a body including: at least one bucket having a sidewall extending between an open end and a closed end along a bucket axis; and a first conduit and a second conduit extending from the sidewall of the bucket, wherein the first and the second conduits extend along a conduit axis that is generally perpendicular to the bucket axis of the at least one bucket;
   a frame inserted into the bucket along the bucket axis and including a valve seat and a valve member biased against the valve seat; and
   a guide in the bucket between the closed end and the frame and extending along a guide axis between: a first opening arranged in a first plane and aligned to receive fluid flow from the first conduit; and a second opening arranged in a second plane and aligned to direct fluid flow through the valve seat,
   wherein the first and second planes are not parallel to one another.

2. A valve assembly according to claim 1, wherein the guide is unitarily formed with the frame.

3. A valve assembly according to claim 1, wherein the guide is unitarily formed with the closed end of the at least one bucket.

4. A valve assembly according to claim 1, wherein the first opening of the guide is convex.

5. A valve assembly according to claim 1, wherein the second opening of the guide is circular.

6. A valve assembly according to claim 1, wherein the second plane of the guide intersects the bucket axis at an angle other than 90°.

7. A valve assembly according to claim 1, wherein a cross-sectional area of the first opening of the guide is unequal to a cross-sectional area of the second opening of the guide.

8. A valve assembly according to claim 1, wherein the second opening of the guide is matched in size and shape to an opening formed by the valve seat.

9. A valve assembly according to claim 1, wherein the guide forms a smooth transition area from the first opening to the second opening.

10. A valve assembly according to claim 1, wherein the guide is separately formed from the frame and body, the guide including at least one ridge and at least one standoff for positioning the guide in the at least one bucket.

11. A valve assembly according to claim 1, further comprising a second bucket having: a sidewall extending between an open end and a closed end along a second bucket axis; a third conduit in fluid communication with the second conduit of the at least one bucket; and a fourth conduit, wherein the third and fourth conduits extends along the conduit axis that is generally perpendicular to the second bucket axis;
   a second frame inserted into the second bucket along the second bucket axis and including a second valve seat and a second valve member biased against the second valve seat, wherein the second valve seat forms a valve opening; and
   a second guide in the second bucket between the closed end and the second frame,
   wherein: the second guide has an inlet in fluid communication with the third conduit and gradually transitions to an outlet matched in size, shape and orientation to the valve opening; and the fourth conduit gradually transitions to a smaller flow path.

12. A kit for a backflow prevention (BFP) assembly comprising:
   a standard check valve cartridge for mounting in a bucket formed by a body of the BFP assembly along a bucket axis, the standard check valve cartridge forming a valve seat opening, wherein the bucket has an inlet along a flow axis that is perpendicular to the bucket axis; and
   a plurality of flow guides for directing flow from the inlet to the valve seat opening, each flow guide having: an inlet opening of a different size; an outlet opening matched in size and shape to the valve seat opening; and a smooth transition from the inlet opening to the outlet opening.

13. A kit as recited in claim 12, wherein the valve seat opening is tangential to the flow axis.

14. A kit as recited in claim 12, wherein the inlet opening is circular and varies from 0.5 to 3.0 inches in diameter.

15. A kit as recited in claim 12, wherein at least one of the plurality of flow guides includes a ridge and standoffs for positioning the at least one of the plurality of flow guides between the standard check valve cartridge and the bucket.

* * * * *